(12) United States Patent
McGuire

(10) Patent No.: US 7,694,769 B2
(45) Date of Patent: Apr. 13, 2010

(54) VEHICULAR FRAME ASSEMBLIES AND VEHICLES HAVING SUPPORT BRACKET

(75) Inventor: Jeremy T. McGuire, Powell, OH (US)

(73) Assignee: Honda Motor Company, Ltd., Tokyo (JP)

( * ) Notice: Subject to any disclaimer, the term of this patent is extended or adjusted under 35 U.S.C. 154(b) by 135 days.

(21) Appl. No.: 12/025,836

(22) Filed: Feb. 5, 2008

(65) Prior Publication Data

US 2009/0194985 A1  Aug. 6, 2009

(51) Int. Cl.
*B62K 5/00* (2006.01)
(52) U.S. Cl. .................. 180/208; 180/908; 180/311; 280/124.109; 280/785; 280/788; 296/26.08
(58) Field of Classification Search .................. 180/908, 180/312, 311, 208, 209; 296/26.08; 280/785, 280/788, 781, 124.109
See application file for complete search history.

(56) References Cited

U.S. PATENT DOCUMENTS

| 4,040,640 | A | 8/1977 | Begg |
| 4,950,026 | A | 8/1990 | Emmons |
| 5,114,183 | A | 5/1992 | Haluda et al. |
| 5,823,629 | A | 10/1998 | Smith et al. |
| 5,879,124 | A | 3/1999 | Brouwer et al. |
| 6,250,679 | B1 | 6/2001 | Schnell |
| 6,293,570 | B1 | 9/2001 | Gottschalk et al. |
| 6,299,240 | B1 | 10/2001 | Schroeder et al. |
| 6,698,775 | B2 | 3/2004 | Ness |
| 6,732,830 | B2 | 5/2004 | Gagnon et al. |
| 7,152,866 | B2 | 12/2006 | Chalin et al. |
| 2008/0277184 | A1* | 11/2008 | Marleau ..................... 180/312 |

FOREIGN PATENT DOCUMENTS

JP  11-59541 A * 3/1999
JP  2007-176431 A * 7/2007

* cited by examiner

*Primary Examiner*—Ruth Ilan
(74) *Attorney, Agent, or Firm*—Ulmer & Berne LLP

(57) ABSTRACT

A vehicular frame assembly includes a mainframe, a support bracket, and a subframe. The support bracket is coupled with the mainframe. The subframe is coupled with the support bracket such that the subframe is stationary with respect to the mainframe. The support bracket is configured for pivotal attachment to a suspension element. Vehicles including a frame assembly having a support bracket are also provided.

17 Claims, 4 Drawing Sheets

VEHICULAR FRAME ASSEMBLIES AND VEHICLES HAVING SUPPORT BRACKET

TECHNICAL FIELD

A vehicular frame assembly can include a support bracket to facilitate coupling of a mainframe with both a subframe and a suspension assembly. In one embodiment, the support bracket can comprise a c-channel.

BACKGROUND

Conventional vehicles include a subframe which is attached to a mainframe of the vehicle. The subframe is configured to support body or other components of the vehicle with respect to the mainframe. Some of these conventional vehicles also include wheel suspension components which are also attached to the mainframe. Attachment of the subframe and the wheel suspension components to the mainframe can often involve complex, bulky, and expensive mounting features.

SUMMARY

In accordance with one embodiment, a vehicular frame assembly comprises a mainframe, a first support bracket, and a subframe. The first support bracket is coupled with the mainframe. The subframe is coupled with the first support bracket such that the subframe is stationary with respect to the mainframe. The first support bracket is configured for pivotal attachment to a suspension element.

In accordance with another embodiment, a vehicle comprises a mainframe, a first support bracket, a subframe, and a suspension assembly. The first support bracket is coupled with the mainframe. The subframe is coupled with the first support bracket. The suspension assembly is coupled with the first support bracket. The subframe is stationary with respect to the mainframe and the suspension assembly is pivotal with respect to the mainframe.

In accordance with yet another embodiment, a vehicle comprises a mainframe, a right c-channel, a left c-channel, a subframe, and a suspension assembly. The mainframe is intersected by an imaginary plane such that the mainframe is bisected into left and right sides. The right c-channel is coupled with the mainframe and disposed entirely upon a right side of the imaginary plane. The left c-channel is coupled with the mainframe and disposed entirely upon a left side of the imaginary plane. The subframe is coupled with each of the right c-channel and the left c-channel such that the subframe is stationary with respect to the mainframe. The suspension assembly is coupled with each of the right c-channel and the left c-channel such that the suspension assembly is pivotal with respect to the mainframe.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
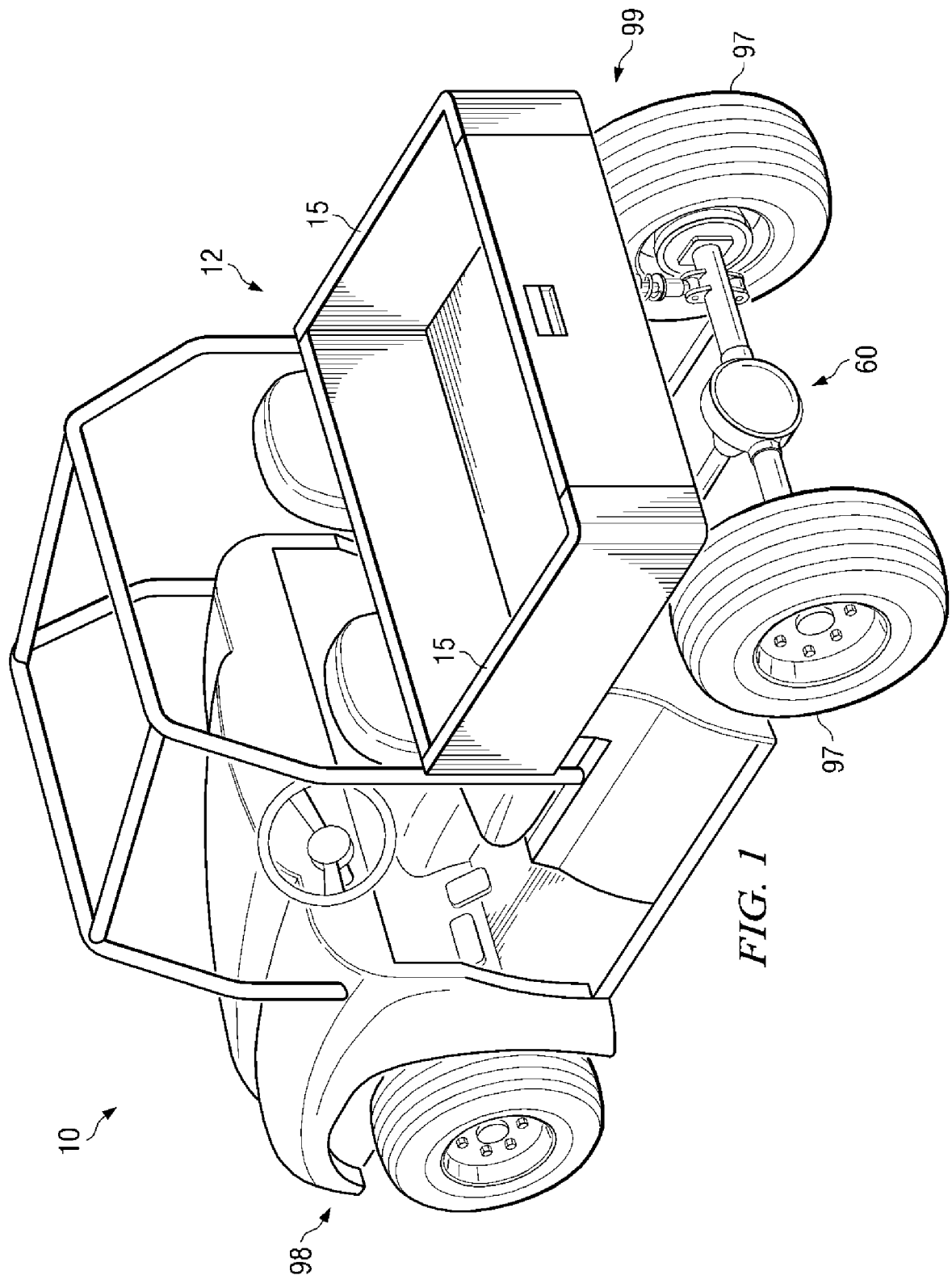
FIG. 1 is an elevated rear perspective view depicting a light utility vehicle ("LUV") in accordance with one embodiment.

The present embodiment and its operation are hereinafter described in detail in connection with the views and examples of FIGS. 1-5, wherein like numbers indicate the same or corresponding elements throughout the views. A vehicle can include a frame assembly. Such a vehicle can comprise, for example, an automobile, a truck, a van, a recreational vehicle, an all terrain vehicle, a utility vehicle, an aircraft, agricultural equipment, construction equipment, a toy, or a mower. In one embodiment, as shown in FIG. 1, the vehicle comprises a utility vehicle such as an LUV 10. Though the LUV 10 is shown to be of a type having four wheels (e.g., 97), it will be appreciated that an LUV or other vehicle can alternatively include more than four wheels or fewer than four wheels.

The LUV 10 can include and extend between front and rear ends 98, 99, as shown in FIG. 1. In one embodiment, the LUV 10 can comprise a bed 12 adjacent the rear end of the LUV 10. The bed 12 can facilitate support of cargo for transportation by the LUV 10. Although the bed 12 is shown in FIG. 1 to include sides 15 to facilitate support of loose cargo (e.g., dirt), it will be appreciated that the bed 12 can be configured in any of a variety of suitable alternative arrangements (e.g., as a flat bed) for carrying cargo. It will also be appreciated that, in lieu of a bed, an LUV or other vehicle may include rear seats, decorative body panels, a cargo rack, a pump unit, a digging implement, a towing platform, a crane, or any of a variety of other features.

Figure 2:
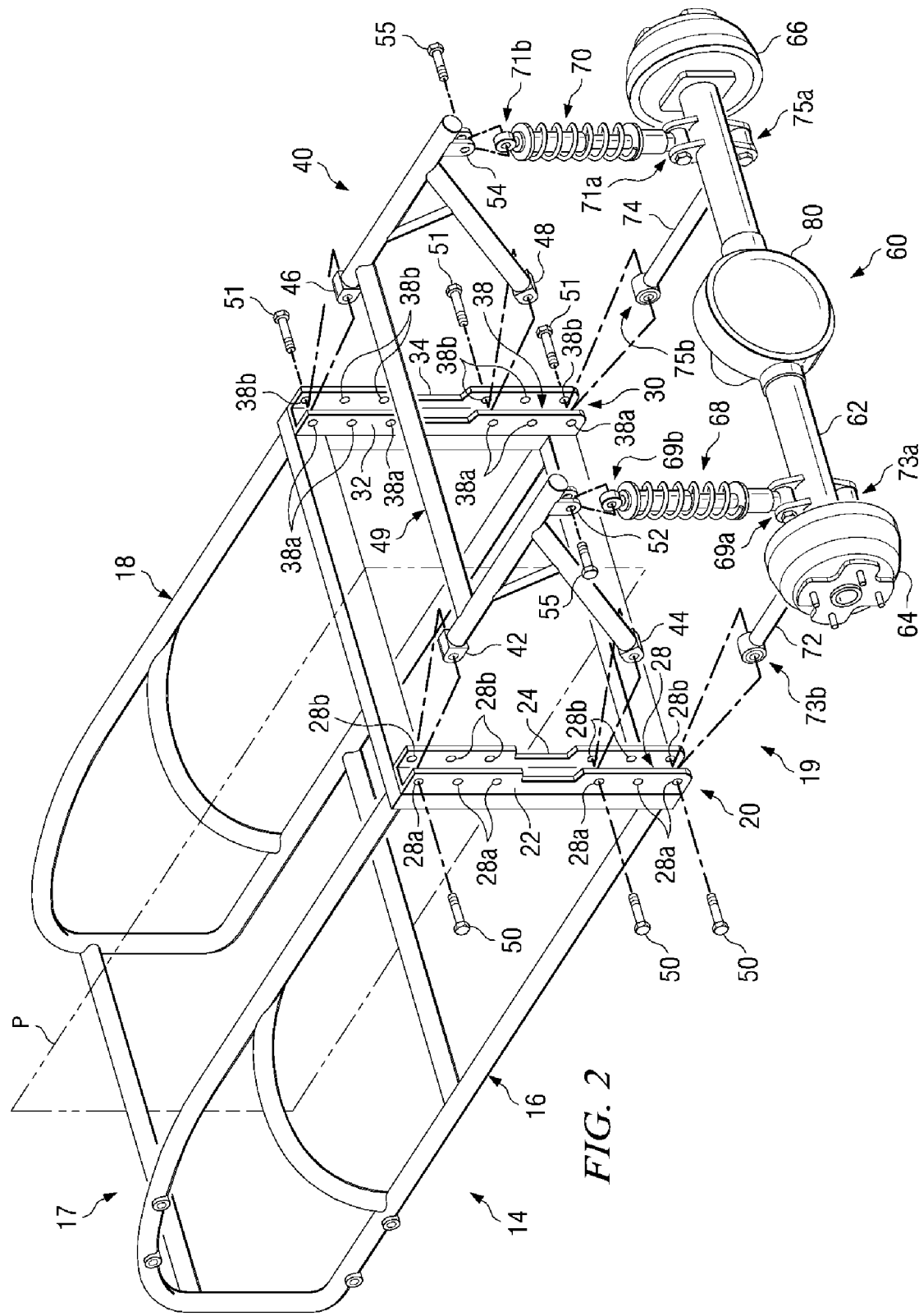
FIG. 2 is an elevated, partially exploded rear perspective view depicting a frame assembly and a suspension assembly of the LUV of FIG. 1 apart from the remaining components of the LUV of FIG. 1.
Figure 3:
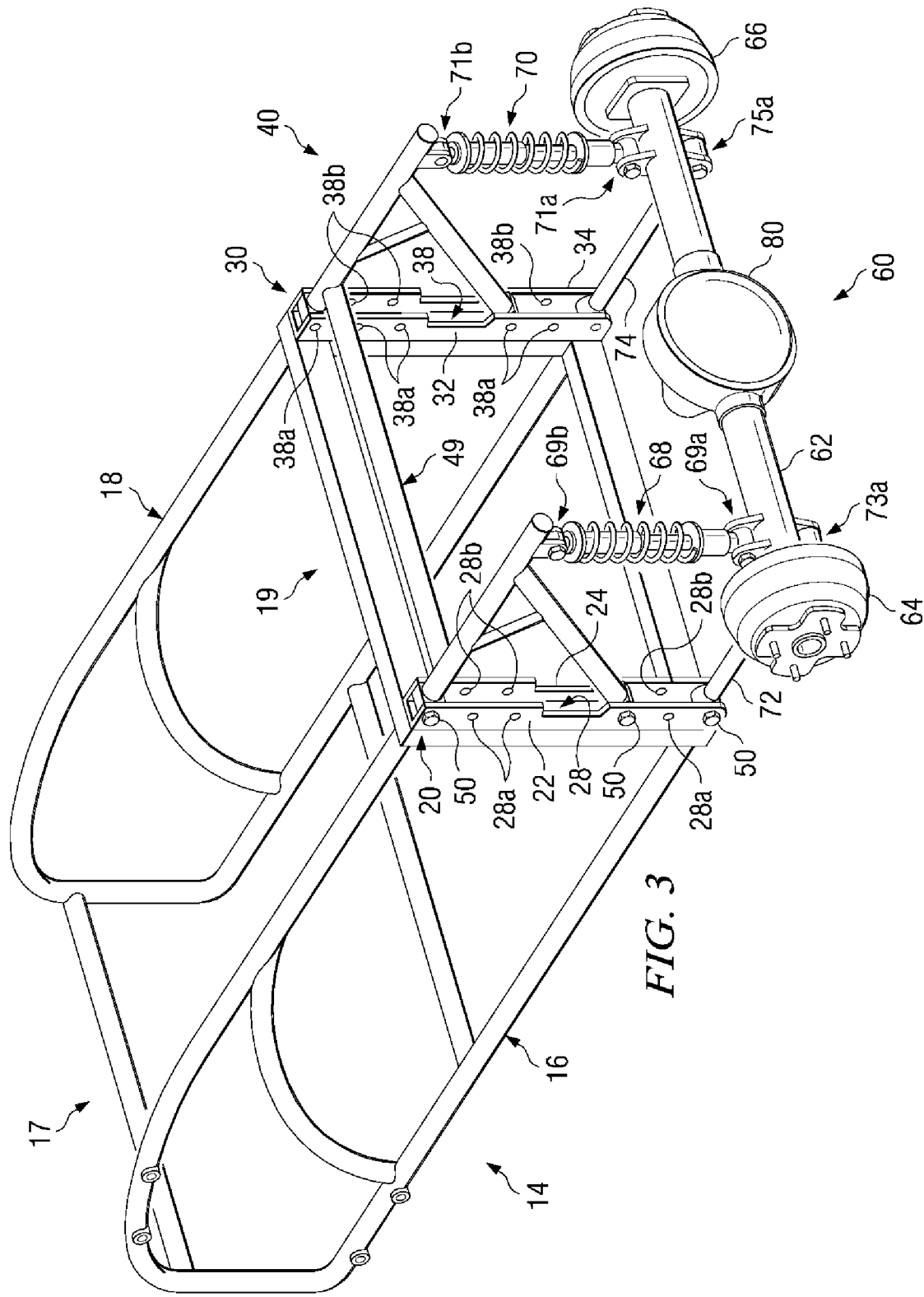
FIG. 3 is an elevated rear perspective view depicting the components of FIG. 2 as assembled.

The LUV 10 can include a frame assembly. The frame assembly can be configured to support and relate various elements of the LUV 10, it being appreciated that each of these various elements of the LUV 10 can be directly or indirectly attached or otherwise supported with respect to the frame assembly. The frame assembly is shown in FIGS. 2-3 to include a mainframe 14. In one embodiment, the mainframe 14 is shown to include and extend between a front portion 17 and a rear portion 19. The frame assembly can further include at least one support bracket coupled with the mainframe 14. For example, as illustrated in FIGS. 2-3, a left c-channel 20 and a right c-channel 30 can each be coupled with the rear portion 19 of the mainframe 14.

The mainframe 14 is shown in FIG. 2 to be intersected by an imaginary plane "P" such that the mainframe 14 is bisected into a left side 16 and a right side 18. The left c-channel 20 is shown in FIGS. 2-3 to be coupled with the mainframe 14 such that the left c-channel 20 is disposed entirely upon a left side of the imaginary plane P. The right c-channel 30 is shown in FIGS. 2-3 to be coupled with the mainframe 14 such that the right c-channel 30 is disposed entirely upon a right side of the imaginary plane P. In one embodiment, the left and right c-channels 20, 30 can be welded to the mainframe 14. In another embodiment, a c-channel or other support bracket can be directly or indirectly attached to the mainframe 14 through use of bolts, adhesives, mechanically interlocking arrangements, and/or otherwise. While the left c-channel 20 and the right c-channel 30 are shown in FIGS. 2-3 to be correspondingly disposed upon opposite sides of the imaginary plane P, it will be appreciated that support brackets can be provided in any of a variety of alternative arrangements or configurations.

Figure 4:
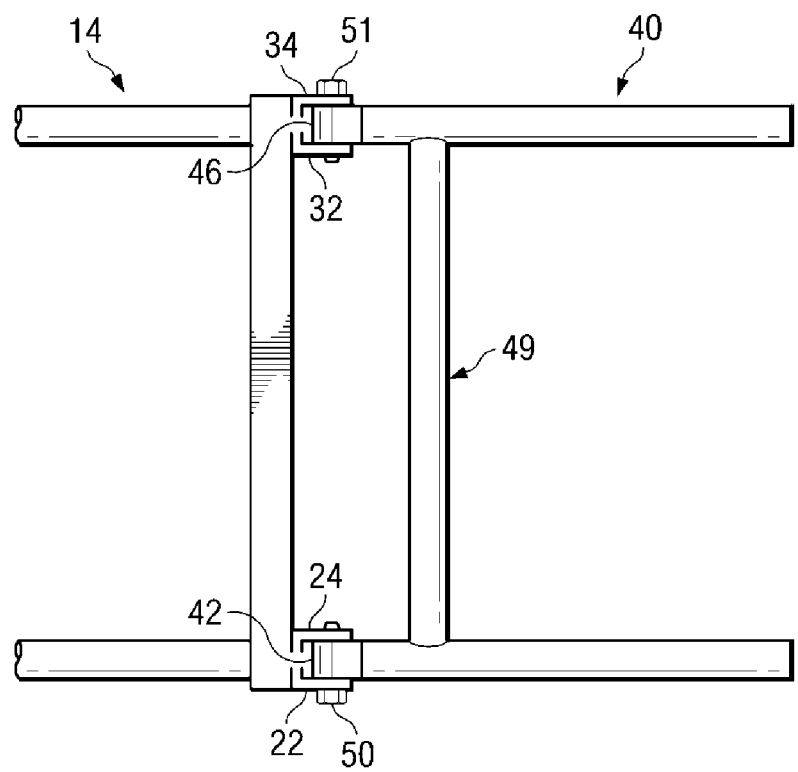
FIG. 4 is an enlarged top plan view depicting a portion of the components of FIG. 3.
Figure 5:
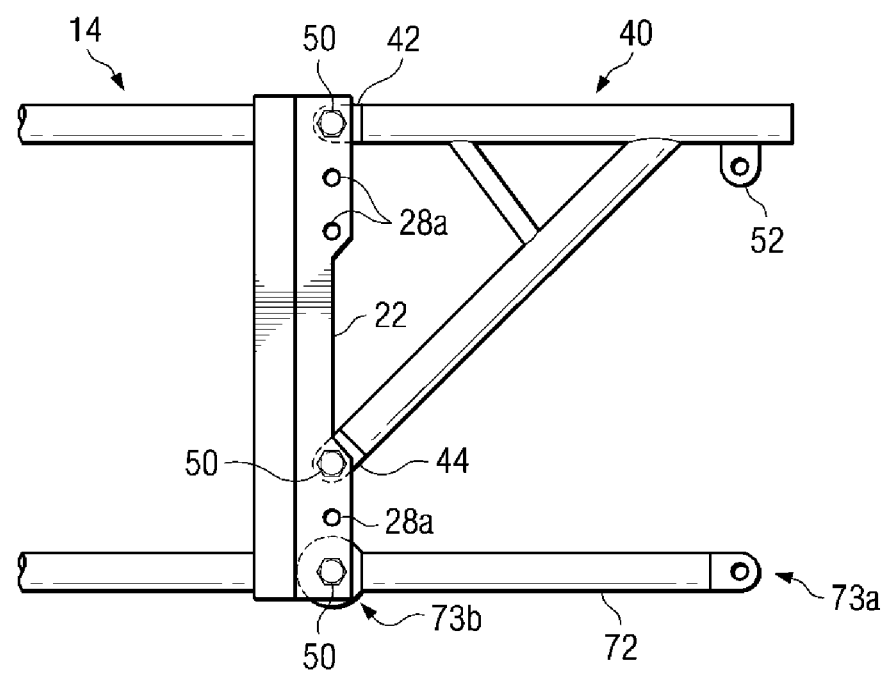
FIG. 5 is an enlarged side elevational view depicting a portion of the components of FIG. 3.

The frame assembly can further include a subframe 40, as shown in FIGS. 2-5. It will be appreciated that the mainframe 14 and the subframe 40, when coupled together as shown in FIGS. 3-5, can cooperate to support various components of the LUV 10. For example, while a mainframe (e.g., 14) can be configured to support an engine, operator seats, and a front suspension assembly of a vehicle, a subframe (e.g., 40) can at least partially support a vehicular body such as a utility bed (e.g., 12) and/or other features of the vehicle. While the subframe 40 is shown to be disposed adjacent to the rear end 99 of the LUV 10, it will be appreciated that a subframe might alternatively be provided adjacent to a front end (e.g., 98) of a vehicle, or adjacent to a left or right side of a vehicle, or in any of a variety of other suitable locations upon a vehicle. Although the mainframe 14 and the subframe 40 are illustrated in FIGS. 2-5 to include tubular members, it will be appreciated that a mainframe and subframe can alternatively include rails, stamped sheet metal components, other components, or a combination thereof. Furthermore, while two c-channels (i.e., 20, 30) are shown in FIGS. 2-5 to facilitate coupling of the subframe 40 to the mainframe 14, it will be appreciated that a single support bracket or more than two support brackets (e.g., c-channels) might alternatively be provided to facilitate coupling of a subframe to a mainframe of a vehicle.

As shown in FIGS. 3-5, the subframe 40 can include longitudinally extending subframe elements such as an upper left element 42, a lower left element 44, an upper right element 46, and a lower right element 48. In the embodiment illustrated in FIGS. 2-5, the left c-channel 20 and the right c-channel 30 are shown to be configured for coupling with the subframe elements 42, 44, 46, 48. In particular, the left c-channel 20 is shown to include substantially parallel first and second sidewalls 22 and 24 which define a groove 28. Additionally, the first sidewall 22 can define apertures 28a that correspond with apertures 28b defined by the second sidewall 24. Similar to the left c-channel 20, the right c-channel 30 can include substantially parallel first and second sidewalls 32 and 34 which can define a groove 38. The first sidewall 32 can define apertures 38a that correspond with apertures 38b defined by the second sidewall 34.

When the upper and lower left elements 42, 44 are provided into the groove 28 of the left c-channel 20, and the upper and lower right elements 46, 48 are provided into the groove 38 of the right c-channel 30, as shown in FIGS. 3-5, it will be appreciated that the upper and lower left elements 42, 44 can reside in a fitted arrangement with first and second sidewalls 22, 24, and the upper and lower right elements 46, 48 can reside in a fitted arrangement with first and second sidewalls 32, 34. This fitted arrangement can facilitate a tight fit between the subframe 40 and the left and right c-channels 20, 30 when these components are pinned together such as shown in FIGS. 3-5. However, it will be appreciated that a support bracket and a subframe can be configured in any of a variety of suitable alternative corresponding arrangements.

Respective support brackets of a frame assembly can be similarly configured such that they are interchangeable. For example, the left and right c-channels 20, 30 are depicted in FIGS. 2-5 as being similarly configured such that they are interchangeable with one another. Such interchangeability can minimize the quantity of different parts required to manufacture and/or repair a vehicle, and can accordingly facilitate a reduction in manufacturing time and cost of the vehicle. It will also be appreciated that provision of identical support brackets can also provide symmetry which can result in certain aesthetic and performance benefits for the vehicle.

As shown in FIGS. 3-5, the subframe 40 can be coupled with the left c-channel 20 and the right c-channel 30 such that the subframe 40 is stationary with respect to the mainframe 14. In one embodiment, each of the upper left element 42 and the lower left element 44 are shown to be pinned to the left c-channel 20 (e.g., with certain of pins 50 provided through certain of apertures 28a and 28b). Additionally, each of the upper right element 46 and the lower right element 48 are shown to be pinned to the right c-channel 30 (e.g., with certain of pins 51 provided through certain of apertures 38a and 38b). In other embodiments, however, a subframe can have any of a variety of other suitable configurations, and can be directly or indirectly coupled with a support bracket through use of fasteners, welding, adhesives, or otherwise. For example, in one alternative embodiment, a subframe can be provided similar to the subframe 40 of FIGS. 2-5, except that the subframe does not include lower left and right elements (e.g., similar to 44, 48), and its upper left and right elements (e.g., similar to 42, 46) are rigidly attached (e.g., welded) to respective left and right c-channels (e.g., 20, 30).

The LUV 10 can include a suspension assembly 60 as shown in FIGS. 1-3. The suspension assembly 60 can include an axle 62 including a left hub 64 and a right hub 66. Wheels (e.g., 97 shown in FIG. 1) can be respectively attached to the left hub 64 and the right hub 66 of the axle 62. In one embodiment, as illustrated in FIGS. 2-3, the axle 62 can comprise a differential 80 for engagement with a driveshaft. In such an embodiment, an engine can be coupled with the driveshaft such that operation of the engine correspondingly drives the wheels (e.g., 97) to propel the LUV 10. It will be appreciated that such an engine can comprise, for example, an internal combustion engine, a hydraulic motor, and/or an electric motor. In an alternative embodiment, in lieu of the differential, an axle can include a sprocket for engagement with a belt or chain which is, in turn, coupled with an engine. It will be appreciated that an axle can be coupled with an engine in any of a variety of alternative configurations. In still another alternative embodiment, a suspension assembly might be provided for an axle which is not configured to be driven by an engine (i.e., a "dead axle"). In yet another embodiment, a suspension assembly might include a pair of front or rear wheels which are independently suspended, and thus which are not supported by a common axle.

Referring to FIGS. 2-3, the suspension assembly 60 can include a left shock absorber assembly 68, a right shock absorber assembly 70, and longitudinally extending left and right suspension links 72, 74. A first end 69a of the left shock absorber assembly 68 and a first end 73a of the left suspension link 72 are shown to be pivotally attached to a portion of the axle 62 adjacent to the left hub 64. A first end 71a of the right shock absorber assembly 70 and a first end 75a of the right suspension link 74 are shown to be pivotally attached to a portion of the axle 62 adjacent to the right hub 66. Although each of the shock absorbers assemblies 68, 70 are shown to comprise a spring in association with a hydraulic fluid-type (e.g., oil, gas) shock absorber, it will be appreciated that a shock absorber assembly can have any of a variety of other suitable configurations which might include, for example, a leaf spring, a linear electromagnetic motor, or the like. In an alternative embodiment, it will be appreciated that shock absorber assemblies and/or suspension links might be rigidly attached to an axle instead of being pivotally attached to the axle.

The suspension assembly 60 can be supported by the frame assembly. In one embodiment, a portion of the suspension assembly 60 can be coupled with the subframe 40. In particular, second ends 69b, 71b of the shock absorber assemblies 68, 70 are shown in FIG. 3 to be pivotally attached with pins (identified as 55 FIG. 2) to respective left and right suspension mounts (respectively identified as 52 and 54 in FIG. 2) of the subframe 40. Another portion of the suspension assembly 60 can be coupled with the left and right c-channels 20, 30 which themselves are attached to the mainframe 14. In particular, as illustrated in FIG. 3, a second end (identified as 73b in FIG. 2) of the left suspension link 72 is shown to be pivotally attached to the left c-channel 20 (e.g., by one of pins 50 inserted through one of apertures 28a and one of apertures 28b) and a second end (identified as 75b in FIG. 2) of the right suspension link 74 is shown to be pivotally attached to the right c-channel 30 (e.g., by one of pins 51 inserted through one of apertures 38a and one of apertures 38b). This attachment is shown in FIG. 3 to involve receipt of the second ends 73b, 75b of the left and right suspension links 72, 74 within grooves 28 and 38 respectively defined by sidewalls 22, 24 of the left c-channel 20 and sidewalls 32, 34 of the right c-channel 30. It will also be appreciated that a suspension assembly can be configured for pivotal attachment with a support bracket in any of a variety of other suitable arrangements.

It will be appreciated that, while the suspension assembly 60 is shown to be coupled with the left and right c-channels 20, 30 in a two-link arrangement, a suspension assembly can alternatively be coupled with one or more support brackets in any of a variety of other suitable arrangements. For example, in one alternative embodiment, a suspension assembly can include two left suspension links and two right suspension links and can be coupled with support brackets of a frame assembly in a four-link arrangement. Also, while respective portions of the suspension assembly 60 are shown to be attached to the subframe 40 and the left and right c-channels 20, 30, it will be appreciated that a suspension assembly can be supported with respect to a frame assembly in any of a variety of other suitable configurations. In one such alternative configuration, a suspension assembly might only be attached to support brackets attached to a mainframe, such that no portion of the suspension assembly is supported by a subframe.

By providing a support bracket (e.g., right and left c-channels 20, 30) which is configured to facilitate coupling of both a subframe (e.g., 40) and a suspension assembly (e.g., 60) with a mainframe (e.g., 14) of a vehicle, it will be appreciated that a vehicle can be manufactured more efficiently and less expensively than can conventional vehicles which involve separate structures to facilitate attachment of a subframe and suspension assembly to a mainframe. By providing interchangeable support brackets for use upon opposite sides of a vehicle, it will be appreciated that fewer parts need to be engineered, tooled, and stocked to manufacture or service a given vehicle. Certain aesthetic advantages might also be attained though use of a common arrangement for attaching a subframe and a suspension assembly to a mainframe, and/or through use of identical support brackets upon opposite sides of a vehicle.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A vehicle comprising:
   a mainframe;
   a first support bracket coupled with the mainframe and defining an interior space;
   a subframe coupled with the first support bracket, at least a portion of the subframe being provided into the interior space defined by the first support bracket; and
   a suspension assembly coupled with the first support bracket and the subframe;
   wherein the subframe is stationary with respect to the mainframe and the suspension assembly is pivotal with respect to the mainframe.

2. The vehicle of claim 1 wherein the suspension assembly comprises a longitudinally extending suspension link, having an end pivotally coupled with the first support bracket.

3. The vehicle of claim 1 wherein the first support bracket comprises a c-channel.

4. The vehicle of claim 1 wherein the interior space defined by the first support bracket comprises a groove.

5. The vehicle of claim 1 wherein the subframe is pinned to the first support bracket.

6. The vehicle of claim 1 wherein the subframe is configured to at least partially support a vehicular body.

7. The vehicle of claim 1 further comprising a second support bracket coupled with the mainframe and additionally coupled with the suspension assembly, wherein the subframe is additionally coupled with the second support bracket.

8. The vehicle of claim 7 wherein the mainframe is intersected by an imaginary plane such that the mainframe is bisected into left and tight sides, the first support bracket being disposed entirely upon a right side of the imaginary plane, and the second support bracket being disposed entirely upon a left side of the imaginary plane.

9. The vehicle of claim 8 wherein the first support bracket and the second support bracket are correspondingly disposed upon opposite sides of the imaginary plane.

10. The vehicle of claim 8 wherein the subframe comprises first and second upper longitudinally extending subframe elements and first and second lower longitudinally extending subframe elements, the first upper subframe element and the first lower subframe element each being coupled with the first support bracket, and the second upper subframe element and the second lower subframe element each being coupled with the second support bracket.

11. A vehicle comprising:
    a mainframe intersected by an imaginary plane such that the mainframe is bisected into left and right sides;
    a right c-channel coupled with the mainframe and defining a first groove, the right c-channel being disposed entirely upon a right side of the imaginary plane;
    a left c-channel coupled with the mainframe and defining a second groove, the left c-channel being disposed entirely upon a left side of the imaginary plane;
    a subframe coupled with each of the right c-channel and the left c-channel such that the subframe is stationary with respect to the mainframe, at least a portion of the subframe being provided into at least one of the first and second grooves; and
    a suspension assembly coupled with each of the right c-channel, and the left c-channels and the subframe such that the suspension assembly is pivotal with respect to the mainframe.

12. The vehicle of claim 11 wherein the subframe is pinned to the right c-channel and the left c-channel.

13. The vehicle of claim 11 wherein the subframe is configured to at least partially support a vehicular body.

14. The vehicle of claim 11 wherein the right c-channel and the left c-channel are interchangeable.

15. A vehicle comprising:
   a mainframe intersected by an imaginary plane such that the mainframe is bisected into left and right sides;
   a right c-channel coupled with the mainframe and disposed entirely upon a right side of the imaginary plane;
   a left c-channel coupled with the mainframe and disposed entirely upon a left side of the imaginary plane;
   a subframe coupled with each of the right c-channel and the left c-channel such that the subframe is stationary with respect to the mainframe, the subframe comprising first and second upper longitudinally extending subframe elements and first and second lower longitudinally extending subframe elements, the first upper subframe element and the first lower subframe element each being coupled with the right c-channel, and the second upper subframe element and the second lower subframe element each being coupled with the left c-channel; and
   a suspension assembly coupled with each of the right c-channel and the left c-channel such that the suspension assembly is pivotal with respect to the mainframe.

16. The vehicle of claim 15 wherein the suspension assembly comprises a longitudinally, extending right suspension element pivotally coupled with the right c-channel and a longitudinally extending left suspension element pivotally coupled with the left c-channel.

17. The vehicle of claim 16 wherein the right c-channel and the left c-channel are correspondingly disposed upon opposite sides of the imaginary plane.

* * * * *

UNITED STATES PATENT AND TRADEMARK OFFICE
CERTIFICATE OF CORRECTION

PATENT NO. : 7,694,769 B2  Page 1 of 1
APPLICATION NO. : 12/025836
DATED : April 13, 2010
INVENTOR(S) : Jeremy T. McGuire It is certified that error appears in the above-identified patent and that said Letters Patent is hereby corrected as shown below:

Column 6, line 18, change "link, having" to --link having--.
Column 6, line 34, change "and tight sides," to --and right sides,--.
Column 6, line 65, change "c-channel, and the left c-channels and" to --c-channel, the left c-channel, and--.
Column 8, line 10, change "longitudinally, extending" to --longitudinally extending--.

Signed and Sealed this

Twenty-fifth Day of May, 2010

David J. Kappos
*Director of the United States Patent and Trademark Office*